United States Patent Office 2,993,937
Patented July 25, 1961

2,993,937
FLUORINATION OF AROMATIC COMPOUNDS
Attila E. Pavlath, Berkeley, Calif., assignor to Stauffer Chemical Company, a corporation of Delaware
No Drawing. Filed Oct. 10, 1958, Ser. No. 766,381
19 Claims. (Cl. 260—646)

This invention relates in general to the fluorination of aromatic compounds and more particularly to a catalytic process wherein a fluorine atom may be substituted for one or more of the hydrogens bonded to an aromatic nucleus.

Many methods have been tried to accomplish aromatic fluoro substitution. Generally such processes, however, produce the desired materials only in very low yields.

Generally, the substitution of a halogen into an aromatic compound in place of one of the hydrogens involves an ionic reaction mechanism wherein a halogen cation is formed. An exception to this occurs where the halogenation is carried out at a high temperature, as about 500° C., for at this level free halogen atoms and hence a free radical mechanism appears to occur. Because of its greater electromegativity, the formation of the fluoro cation needs about 100K cal./mole more than the other halogen cations. This would appear to explain why it is impossible to use elemental fluorine for nuclear fluorination by a reaction analogous to those which have been found suitable for the other halogens. Where an effort is made to use fluorine the reaction mechanism appears to favor the addition reaction rather than the substitution reaction. Similar results are obtained where various metal fluorides are used as fluorinating agents.

It has now been found that various halogen fluorides, which may be represented generally as materials having the formula $XF_m$, where X is Cl, Br or I and $m$ is 3, 5 or 7, are capable of providing the necessary fluorine for a substitution reaction involving an aromatic nucleus provided that the fluorinating agents are used with a catalyst of the general formula $YF_n$, where Y is B, P, As, Sb, Nb, Ta or V and $n$ is 3 or 5. Where yields obtained by the most closely related processes known heretofore were in the general vicinity of a maximum of 10% (in one or two instances extending as high as 25% it has been found possible here to obtain yields as high as 70–80% using certain aromatic hydrocarbons. Such high yields are not possible with all aromatic hydrocarbons but when the catalysts of this invention are employed with the aforementioned fluorinating agents, yields of any given fluorinated aromatic compound are considerably higher than those which have been obtained herefore by known processes.

Typical aromatic materials, and those to which the examples following are directed, are benzene, toluene, chlorobenzene, bromobenzene and nitrobenzene. Other suitable aromatic compounds are fluorobenzene, xylene, ethylbenzene, trifluoromethylbenzene, naphthalene, biphenylene, diphenyloxide, phenols which have been substituted with lower alkyl groups on the oxygen thereof, anilines which have been substituted on the nitrogen thereof with lower alkyl groups, various quinones, various benzoyl esters and various phthalic acid esters such as the esters of isophthalic acid and terephthalic acid.

In the various tests which are detailed below, an ultraviolet spectroscopic method was used to detect the presence of the fluorinated compounds. The minimum which may be detected in this fashion is 0.2–0.3% except in the case of nitrofluorobenzenes where this value will be found to be about 1.5% of the fluorinated materials. This method is more reliable than that generally shown by the art wherein fractionation of the reaction mixture is employed.

Preferred catalysts are $BF_3$, $PF_5$, $AsF_5$ and $SbF_5$ (listed in order of decreasing reactivity). Others which may be used are $NbF_5$, $TaF_5$ and $VF_5$. The fluorinating agents are $ClF_3$, $BrF_3$ and $BrF_5$, $IF_5$ and $IF_7$. The chlorine-containing fluorinating agent is the most reactive and the iodine-containing materials the least reactive.

It is presumed that the cation $XF^+_{m-1}$ is the actual fluorinating agent. This cation may be regarded as a combination of compound $XF_{m-2}$ and the cation $F^+$. The complex formation may take place by the polarization of $XF_m$ into $XF^+_{m-1}$ and $F^-$ anion, the $F^-$ anion then reacting with the compound $YF_n$ to yield $YF^-_{n+1}$, a complex anion. The general reaction is shown by:

$$XF_m + YF_n \rightarrow XF^+_{m-1} YF^-_{n+1}$$

Such complexes are $BrF_2^+ SbF_6^-$ and the analogous materials wherein other of the two remaining halogens replace the bromine and/or other of the aforementioned elements are substituted for the antimony.

However, the actual mechanism by which the complex fluoro cation, if any, is formed is not entirely understood nor is the actual nature of the substitution reaction and hence it is not desired to limit the invention to any particular theory.

In various runs wherein efforts were made to form the complex, a solid, crystalline, more or less stable compound was formed which apparently was the molecular complex of the reacted compounds in one-one mole proportion. The stability of the complexes decreases from the chloros to the bromos to the iodos. For example, $ClF_2^+ BF_4^-$ is stable for long periods of time at room temperature but the $IF_4^+ BF_4^-$ decomposes at $-20°$ C. Stability increases from B to P to As to Sb. For example, the $IF_4^+ SbF_6^-$ is reasonably stable even above room temperature.

The reactivity of the solid complexes with the aromatic compounds varies according to the reaction partners used (the fluorinating agent and the catalyst). The reactivity decreases from the chloro to the bromo to the iodo and from B to P to As to Sb. The $ClF_2^+ BF_4^-$ reacts with the aromatic compounds in an explosive manner even when used in 0.1 gram quantities but the $IF_4^+ SbF_6^-$ can be reacted in far greater quantities without any great evolution of heat.

The reaction of the complexes with the aromatic materials preferably is carried out in a fluorinated hydrocarbon which is inert to both the fluorinating agent and the organic material used and is a solvent for both. Alternatively, the volatile halogen fluorides may be employed as fluorinating agents. In this case, the volatile catalyst is diluted with and carried by $N_2$.

The reaction by which the aromatic material has one hydrogen of the nucleus thereof replaced is thought to proceed in the manner set forth above. However, it is to be emphasized that the mechanism is not entirely understood and the scope of the invention is not to be limited to any particular theory.

Where $ClF_3$ is used as the fluorinating agent whereby to form the $ClF_2^+$ cation, it may be that this reacts with the aromatic compounds to form an aryl chlorofluoride (an unknown compound similar to the known aryl iodofluorides) according to the mechanism:

$$ClF_2^+ + ArH \rightarrow ArClF_2 + H^+$$

These compounds may decompose to form free fluorine according to the following reaction:

$$ArClF_2 \rightarrow ArCl + F_2$$

But the $ArClF_2$ may also react with the Lewis acid present again to form ionic compounds containing complex fluoro cations:

$$ArClF_2 + BF_3 \rightarrow ArClF^+ + BF_4^-$$

and the ArClF+ may react with other aromatic compounds:

$$ArClF^+ + ArH \rightarrow ArCl + ArF + H^+$$

A reaction mechanism of this sort might explain why the stronger Lewis acids are more effective since they would polarize better, thus forming the arylhalofluorides; also such stronger Lewis acids can decrease homopolymerization.

Considerable variations in the quantities of reactants used are possible and variations in the reaction temperatures will be found desirable depending on the reactivity of the complexes or fluorinating agent and catalyst admixture used. Use of mixtures of catalyst or fluorinating agents is also possible.

Specific examples showing the use of each of the preferred catalysts and fluorinating agents are set forth below. In the first two examples, the complexes were first prepared according to the method of Example VIII. These complexes were reacted in turn with the aromatic materials selected. In Examples IV–VII and IX, a reaction was carried out wherein the fluorinating agent and the catalyst were introduced individually, the catalysts selected being volatile materials which could be carried in a nitrogen stream.

EXAMPLE I 31 g. of $ClF_2^+SbF_6^-$ were suspended in 150 ml. of inert polyfluorinated solvent and 46 g. of toluene were added at −50° C. The reaction was carried out in all-quartz equipment. After an hour of vigorous stirring, the temperature was increased slowly to room temperature and kept for 4 hours. The reaction mixture was washed with water, $Na_2CO_3$ solution and water again. After drying, the solvent was eliminated and the reaction mixture was fractionated. The fraction between 110–120° C. was analyzed by ultraviolet spectroscopy. According to the analysis, the fraction contained 1.7 g. p-fluoro-toluene.

EXAMPLE II 21.5 g. of $IF_6^+AsF_6^-$ were suspended in 150 ml. of inert polyfluorinated solvent and the suspension was treated with 28 g. of chlorobenzene at −40° C. as mentioned in Example I. After working up, the reaction mixture was fractionated. The fraction between 125–140° C. was analyzed. It contained 3.3 g. of p-chlorofluorobenzene.

EXAMPLE III 22 g. of $IF_4^+SbF_6^-$ were added to 78 g. of benzene under vigorous stirring at room temperature and the stirring was continued for six hours. The reaction mixture was worked up in the same way as in Example I. The mixture was analyzed without fractionation; 0.8 g. of fluorobenzene was determined to be present.

EXAMPLE IV 17.5 g. of $BrF_5$ by a flow of nitrogen (10 l./hr.) and 15 g. of $PF_5$ were introduced into 112.5 g. of chlorobenzene at room temperature. The $BrF_5$ and $PF_5$ were mixed just before contacting the chlorobenzene. After the usual working up method, it was analyzed without fractionation. 4.2 g. of p-chlorofluorobenzene were detected.

EXAMPLE V 13.7 g. of $BrF_3$ by a flow of nitrogen (10 l./hr.) and 10 g. of $BF_3$ were introduced into 61.5 g. of nitrobenzene at room temperature by the same way as before. Without fractionation, 0.8 g. of m-nitrofluorobenzene was detected by ultraviolet spectroscopy.

EXAMPLE VI 13 g. of $IF_7$ by a flow of nitrogen (10 l./hr.) and 12 g. of $AsF_5$ by a flow of nitrogen (10 l./hr.) were introduced into 92 g. of toluene at room temperature by the same way as before. After the usual working up method, 1.6 g. of p-fluorotoluene were detected.

EXAMPLE VII 9.3 g. of $ClF_3$ by a flow of nitrogen (the same as before) and 16 g. of $PF_5$ were introduced into 78 g. of benzene by the same method as mentioned before. The analysis showed the presence of 5.9 g. of fluorobenzene after the usual working up.

EXAMPLE VIII 0.1 mole of $ClF_3$ was placed in a quartz test tube and the test tube was placed in liquid air. The volatile $BF_3$ was condensed on the surface of the halogen fluoride in excess and the reaction mixture was allowed to melt slowly under stirring using a quartz stick. Immediately there formed a solid complex and the excess $BF_3$ was evaporated in a Dry Ice-acetone bath. This material was stable at −40° C. 0.1 mole of this halogen fluoride-$BF_3$ complex was suspended in 200 ml. inert polyfluorinated solvent held at −40° C. 0.5 ml. benzene was added under stirring and cooling. After 3–5 hours the reaction vessel was warmed to room temperature and allowed to stand overnight. The product was then worked up and 2.6 g. of p-chlorofluorobenzene was detected.

EXAMPLE IX 0.5 mole bromobenzene is placed in a quartz test tube and 0.1 mole $BrF_5$ introduced with a stream of $N_2$. The halogen fluoride was mixed with volatile $PF_5$ just before arriving at the surface of the aromatic compound. After working up, the reaction mixture is analyzed by the ultraviolet spectroscopic method.

A large number of additional tests have been run both with and without a catalyst so as to provide a basis for comparing yields. The runs reported in Tables B, C, D and E were made in the manner set forth in the examples above and the runs reported in Table A were also so made except the catalyst was omitted.

In the various tables below, when the term "in situ" is used, it is intended to indicate that the $XF_m$ material and the $YF_n$ material were individually passed in gaseous form into the aromatic hydrocarbon and allowed to react therein, whereby to form the complex. See Examples IV–VII above. When the term "salt" is used in the tables, it is intended to indicate that the $XF_m$ material was first reacted with alkali or alkaline earth fluorides to form a solid complex which in turn was directly added to the aromatic hydrocarbon. See Example III above. When the term "solution" is used in the tables, it is intended to indicate that the $XF_m$ and $YF_n$ materials were first reacted to preform the complex which in turn was suspended in an inert polyfluorinated solvent therefor and the solution then added to the organic hydrocarbon.

*Table A*

[Without catalyst]

|  | Benzene | Toluene | Chlorobenzene | Nitrobenzene |
|---|---|---|---|---|
|  | Percent | Percent | Percent | Percent |
| $ClF_3$, in situ | 10.5 | 6.2 | 3.5 | 1.9 |
| $BrF_3$, in situ salt | 3.1 | 2.3 | 1.2 | ? |
|  | 4.1 | 4.5 | 1.9 | 1.5 |
| $IF_5$, solution salt | 1.5 | 1.2 | 0.8 | ? |
|  | 2.1 | 1.4 | 1.0 | ? |

*Table B*

[$BF_3$ catalyst]

|  | Benzene | Toluene | Chlorobenzene | Nitrobenzene |
|---|---|---|---|---|
|  | Percent | Percent | Percent | Percent |
| $ClF_3$, in situ solution | 78.2 | 71.3 | 35.4 | 10.5 |
|  |  | 35.2 | 20.3 | 3.7 |
| $BrF_3$, in situ solution | 21.5 | 17.3 | 11.1 | 5.2 |
|  |  | 22.1 | 15.1 | 2.2 |
| $IF_5$, solution | 5.7 | 3.5 | 2.5 | 1.9 |

Table C

[PF$_5$ catalyst]

|  | Benzene | Toluene | Chlorobenzene | Nitrobenzene |
|---|---|---|---|---|
| ClF$_3$, in situ solution | Percent 62.1 | Percent 63.1 | Percent 27.2 | Percent 11.5 |
|  |  | 33.4 | 19.3 | 3.2 |
| BrF$_3$, in situ solution | 18.7 | 17.3 | 9.7 | 5.1 |
|  |  | 18.2 | 9.6 | 3.4 |
| IF$_5$, solution | 7.2 | 6.5 | 2.9 | 2.4 |

Table D

[AsF$_5$ catalyst]

|  | Benzene | Toluene | Chlorobenzene | Nitrobenzene |
|---|---|---|---|---|
| ClF$_3$, in situ solution | Percent 42.1 | Percent 30.3 | Percent 18.2 | Percent 5.7 |
|  | 37.5 | 31.2 | 13.4 | 4.1 |
| BrF$_3$, in situ solution | 13.1 | 10.2 | 7.5 | 3.9 |
|  | 14.2 | 11.1 | 6.7 | 2.7 |
| IF$_5$, solution | 4.2 | 3.7 | 2.8 | 1.8 |

Table E

[SbF$_5$ catalyst]

|  | Benzene | Toluene | Chlorobenzene | Nitrobenzene |
|---|---|---|---|---|
| ClF$_3$, solution | Percent 20.2 | Percent 15.7 | Percent 9.2 | Percent 3.2 |
| BrF$_3$, solution | 10.3 | 9.1 | 4.7 | 1.9 |
| IF$_5$, solution | 4.7 | 3.9 | 2.1 | ? |

Obviously many modifications and variations of this invention may be made without departing from the spirit and scope thereof and only such limitations should be imposed as are indicated in the appended claims.

I claim:

1. A process for substituting fluorine in place of a hydrogen on an aromatic nucleus without affecting the degree of unsaturation of said nucleus comprising: reacting an aromatic compound having at least a single hydrogen bonded to the aromatic nucleus thereof with a halogen fluoride in the presence of a catalyst selected from the class consisting of fluorides of arsenic, antimony, phosphorus, boron, tantalum, vanadium and niobium, and recovering a fluorinated aromatic reaction product.

2. A process for substituting fluorine in place of a hydrogen atom on an aromatic nucleus without affecting the degree of unsaturation of said nucleus comprising: reacting an aromatic compound having at least a single hydrogen bonded to the aromatic nucleus thereof with IF$_7$ in the presence of a catalyst selected from the class consisting of fluorides of arsenic, antimony, phosphorus, boron, tantalum, vanadium and niobium, and recovering a fluorinated aromatic reaction product.

3. A process for substituting fluorine in place of a hydrogen atom on an aromatic nucleus without affecting the degree of unsaturation of said nucleus comprising: reacting an aromatic compound having at least a single hydrogen bonded to the aromatic nucleus thereof with ClF$_3$ in the presence of a catalyst selected from the class consisting of fluorides of arsenic, antimony, phosphorus, boron, tantalum, vanadium and niobium, and recovering a fluorinated aromatic reaction product.

4. A process for substituting fluorine in place of a hydrogen atom on an aromatic nucleus without affecting the degree of unsaturation of said nucleus comprising: reacting an aromatic compound having at least a single hydrogen bonded to the aromatic nucleus thereof with BrF$_3$ in the presence of a catalyst selected from the class consisting of fluorides of arsenic, antimony, phosphorus, boron, tantalum, vanadium and niobium, and recovering a fluorinated aromatic reaction product.

5. A process for substituting fluorine in place of a hydrogen atom on an aromatic nucleus without affecting the degree of unsaturation of said nucleus comprising: reacting an aromatic compound having at least a single hydrogen bonded to the aromatic nucleus thereof with IF$_5$ in the presence of a catalyst selected from the class consisting of fluorides of arsenic, antimony, phosphorus, boron, tantalum, vanadium and niobium, and recovering a fluorinated aromatic reaction product.

6. A process for substituting fluorine in place of a hydrogen atom on an aromatic nucleus without affecting the degree of unsaturation of said nucleus comprising: reacting an aromatic compound having at least a single hydrogen bonded to the aromatic nucleus thereof with BrF$_5$ in the presence of a catalyst selected from the class consisting of fluorides of arsenic, antimony, phosphorus, boron, tantalum, vanadium and niobium, and recovering a fluorinated aromatic reaction product.

7. A process for substituting fluorine in place of hydrogen on the aromatic nucleus of a lower alkyl-substituted benzene without affecting the degree of unsaturation thereof comprising: reacting a lower alkyl-substituted benzene having at least a single hydrogen bonded to the aromatic nucleus thereof with a halogen fluoride in the presence of a catalyst selected from the class consisting of fluorides of arsenic, antimony, phosphorus, boron, tantalum, vanadium and niobium, and recovering a fluorinated aromatic reaction product.

8. A process for substituting fluorine in place of hydrogen on the aromatic nucleus of toluene without affecting the degree of unsaturation thereof comprising: reacting toluene with a halogen fluoride in the presence of a catalyst selected from the class consisting of fluorides of arsenic, antimony, phosphorus, boron, tantalum, vanadium and niobium, and recovering a fluorinated aromatic reaction product.

9. A process for substituting fluorine in place of hydrogen on the aromatic nucleus of a halobenzene without affecting the degree of unsaturation thereof comprising: reacting a halobenzene having at least a single hydrogen bonded to the aromatic nucleus thereof with a halogen fluoride in the presence of a catalyst selected from the class consisting of fluorides of arsenic, antimony, phosphorus, boron, tantalum, valandium and nobium, and recovering a fluorinated aromatic reaction product.

10. A process for substituting fluorine in place of hydrogen on the aromatic nucleus of chlorobenzene without affecting the degree of unsaturation thereof comprising; reacting chlorobenzene with a halogen fluoride in the presence of a catalyst selected from the class consisting of fluorides of arsenic, antimony, phosphorus, boron, tantalum, vanadium and niobium, and recovering a fluorinated aromatic reaction product.

11. A process for substituting fluorine in place of hydrogen on the aromatic nucleus of nitrobenzene without affecting the degree of unsaturation thereof comprising: reacting nitrobenzene with a halogen fluoride in the presence of a catalyst selected from the class consisting of fluorides of arsenic, antimony, phosphorus, boron, tantalum, vanadium and niobium, and recovering a fluorinated aromatic reaction product.

12. A process for substituting fluorine in place of hydrogen on the aromatic nucleus of benzene without affecting the degree of unsaturation thereof comprising: reacting benzene with a halogen fluoride in the presence of a catalyst selected from the class consisting of fluorides of arsenic, antimony, phosphorus, boron, tantalum, vanadium and niobium, and recovering a fluorinated aromatic reaction product.

13. A process for substituting fluorine in place of a hydrogen on an aromatic nucleus without affecting the degree of unsaturation thereof comprising: reacting an aromatic compound having at least a single hydrogen bonded to the aromatic nucleus thereof with a halogen fluoride in the presence of a BF$_3$ catalyst, and recovering a fluorinated aromatic reaction product.

14. A process for substituting fluorine in place of hydrogen on an aromatic nucleus without affecting the degree of unsaturation thereof comprising: reacting an aromatic compound having at least a single hydrogen bonded to the aromatic nucleus thereof with a halogen fluoride in the presence of a $PF_5$ catalyst, and recovering a fluorinated aromatic reaction product.

15. A process for substituting fluorine in place of a hydrogen on an aromatic nucleus without affecting the degree of unsaturation thereof comprising: reacting an aromatic compound having at least a single hydrogen bonded to the aromatic nucleus thereof with a halogen fluoride in the presence of an $AsF_5$ catalyst, and recovering a fluorinated aromatic reaction product.

16. A process for substituting fluorine in place of a hydrogen on an aromatic nucleus without affecting the degree of unsaturation thereof comprising: reacting an aromatic compound having at least a single hydrogen bonded to the aromatic nucleus thereof with a halogen fluoride in the presence of an $SbF_5$ catalyst, and recovering a fluorinated aromatic reaction product.

17. A process for substituting fluorine in place of a hydrogen on an aromatic nucleus without affecting the degree of unsaturation of said nucleus comprising: reacting a halogen fluoride and a compound selected from the class consisting of fluorides of arsenic, antimony, phosphorus, boron, tantalum, vanadium and niobium whereby to form a complex, thereafter reacting said complex with an aromatic compound having at least a single hydrogen bonded to the aromatic nucleus thereof, and recovering a fluorinated aromatic reaction product.

18. A process for substituting fluorine in place of a hydrogen on an aromatic nucleus without affecting the degree of unsaturation of said nucleus comprising: reacting an aromatic compound having at least a single hydrogen bonded to the aromatic nucleus thereof with gaseous halogen fluoride in the presence of a catalyst selected from the class consisting of fluorides of arsenic, antimony, phosphorus, boron, tantalum, vanadium and niobium, and recovering a fluorinated aromatic reaction product.

19. A process for substituting fluorine in place of a hydrogen on an aromatic nucleus without affecting the degree of unsaturation thereof comprising: reacting a halogen fluoride with a catalyst selected from the class consisting of fluorides of arsenic, antimony, phosphorus, boron, tantalum, vanadium and niobium whereby to form a complex, placing said complex in a polyfluorinated hydrocarbon solvent therefor, reacting said complex with an aromatic compound having at least a single hydrogen bonded to the aromatic nucleus thereof, and recovering a fluorinated aromatic reaction product.

References Cited in the file of this patent
UNITED STATES PATENTS

| | | |
|---|---|---|
| 2,013,030 | Colcott et al. | Sept. 3, 1935 |
| 2,574,619 | Cady | Nov. 13, 1951 |
| 2,702,306 | Gall et al. | Feb. 15, 1955 |